United States Patent [19]

Wilk

[11] Patent Number: 6,055,214
[45] Date of Patent: Apr. 25, 2000

[54] IMAGING SYSTEM FOR DETECTING UNDERGROUND OBJECTS AND ASSOCIATED METHOD

[76] Inventor: Peter J. Wilk, 185 W. End Ave., New York, N.Y. 10023

[21] Appl. No.: 09/121,488

[22] Filed: Jul. 23, 1998

[51] Int. Cl.[7] .............................. G01S 3/80; G01N 29/00
[52] U.S. Cl. .................................. 367/99; 89/1.13; 73/594
[58] Field of Search ................................ 367/1, 13, 56, 367/87, 99, 96; 89/1.13; 73/594, 625, 628; 181/108

[56] References Cited

U.S. PATENT DOCUMENTS

| | | | |
|---|---|---|---|
| 3,585,577 | 6/1971 | Rollwitz et al. ........................ | 367/96 |
| 4,727,329 | 2/1988 | Behr ...................................... | 324/345 |
| 5,128,904 | 7/1992 | Chambers .............................. | 367/129 |
| 5,323,683 | 6/1994 | Dilhan et al. ......................... | 89/1.13 |
| 5,452,639 | 9/1995 | Aulenbacher et al. ................ | 89/1.13 |
| 5,563,848 | 10/1996 | Rogers et al. ......................... | 367/99 |
| 5,672,825 | 9/1997 | Uno et al. .............................. | 73/579 |
| 5,808,969 | 9/1998 | Arnaud et al. ........................ | 73/594 |

*Primary Examiner*—Ian J. Lobo
*Attorney, Agent, or Firm*—R. Neil Sudol; Henry D. Coleman

[57] ABSTRACT

In a method for detecting objects hidden underground, a plurality of electromechanical transducers including at least one electroacoustic pressure wave generator and at least one acoustoelectric sensor are disposed above a ground structure. Locations of the transducers relative to one another are determined. The pressure wave generator is energized to produce an outgoing pressure wave which is transmitted into the ground structure. Incoming pressure waves reflected by underground surfaces in response to the outgoing pressure wave are sensed and analyzed to determine three-dimensional shapes of underground objects disposed in the ground structure.

26 Claims, 8 Drawing Sheets

IMAGING SYSTEM FOR DETECTING UNDERGROUND OBJECTS AND ASSOCIATED METHOD

BACKGROUND OF THE INVENTION

This invention relates to an imaging system utilizing sonic or ultrasonic pressure waves for sensing purposes. More particularly, this invention relates to such a system for use in detecting and surveying underground surfaces. This invention also relates to an associated method.

One of the great problems in the world today is the presence of substantial numbers of land mines in various regions of the world. These mines were placed during armed conflicts, guerilla and civil wars and although those conflicts have been terminated in many cases, the land mines remain. The land mines are particularly dangerous for children.

OBJECTS OF THE INVENTION

An object of the present invention is to provide an automated sensing system which facilitates detection of objects underground. A more particular object of the present invention is to provide such a sensing system which facilitates the detection of land mines.

An associated object of the present invention is to provide such imaging system which facilitates identification of objects which are located underground. The imaging system may be capable of determining the type of land mine This information is useful in selecting a method of destroying detected land mines.

A further object of the present invention is to provide an associated imaging method enabling the visual inspection of underground objects.

These and other objects of the present invention will be apparent from the drawings and descriptions herein.

SUMMARY OF THE INVENTION

A method for detecting objects hidden underground comprises, in accordance with the present invention, steps of disposing a plurality of electromechanical transducers including at least one electroacoustic pressure wave generator and at least one acoustoelectric sensor above a ground structure, determining locations of the transducers relative to one another, energizing the pressure wave generator to produce an outgoing pressure wave, transmitting the outgoing pressure wave into the ground structure, sensing incoming pressure waves reflected by underground surfaces in response to the outgoing pressure wave, and analyzing the incoming pressure waves to determine three-dimensional shapes of underground objects disposed in the ground structure.

It is generally contemplated that the electromechanical transducers are all attached to a common carrier. The electromechanical transducers are deployed above the ground structure by moving the carrier into position above the ground structure. Where the carrier is a flexible member such as a web or bag, the disposing of the electromechanical transducers above the ground surface including placing the carrier in contact with a ground surface. In the case of a flexible carrier, where the positions of the transducers relative to one another varies depending on the configuration of the carrier, the locations of the transducers are determined after the placing of the carrier in contact with the ground surface. Determining the locations of the transducers relative to one another then includes analyzing pressure waves transmitted directly from the pressure wave generator to the sensor.

Where the carrier is substantially rigid, as in the case of a frame or truss work, the disposing of the electromechanical transducers above the ground surface includes holding the carrier above and spaced from a ground surface. The carrier or frame may extend outwardly from the front, rear or side of a land vehicle such as a tank or other all-terrain vehicle. The carrier or frame may be movably mounted to the land vehicle for varying the vertical distance between the transducers and an underlying, ground surface. This may be necessary where the terrain is uneven. Also, the detection of underground objects such as land mines may be facilitated by varying the spacing between the carrier and the ground surface.

Another technique for optimizing the collection of adequate data as to the shapes of underground objects is to vary the frequency of pressure waves produced by the pressure wave generator. Where there are multiple electromechanical transducers for generating pressure waves, these transducers may be designed for producing pressure waves within respective ranges. Alternatively, each such transducer may be capable of producing pressure wave of different frequencies in a predetermined sequence or simultaneously.

Different kinds of information are obtainable by pressure waves of different frequencies. For example, data pertaining to surface details are more readily obtainable by higher frequency pressure waves inasmuch as pressure waves of higher frequencies yield an enhanced resolution relative to pressure waves of lower frequencies. Pressure waves of lower frequencies may be relied on in an initial scanning step to determine whether there are any objects in a predetermined size range beneath a ground surface. Subsequent scans at higher frequencies are used to determine details of possible objects of interest.

The transducer carrier may mounted to an air-borne vehicle such as a helicopter or a balloon. In that case, the disposing of the electromechanical transducers above the ground structure includes moving the air-borne vehicle over a ground surface and suspending the carrier and the electromechanical transducers from the air-borne vehicle.

The method preferentially includes generating a video signal encoding an image of an underground object and transmitting the video signal to a video monitor. Thus, images of underground objects may be viewed by a human operator. The operator and the monitor may be located in the transport vehicle holding the carrier and the transducers. Alternatively, the operator and the monitor may be remotely located. In the latter case, the movement of the vehicle and the carrier over the land surface is effectuated by a remotely controlled robot mechanism.

In accordance with another feature of the invention, the displayed image is selected from among a multiplicity of possible images of the underground surfaces. The method then contemplates subsequently selecting a different image from among the possible images and displaying the different image on the monitor.

Where the outgoing pressure wave and the incoming pressure waves are ultrasonic, further comprising wetting the ground structure to facilitate transmission of the outgoing pressure wave and the incoming pressure waves through the ground structure.

Where the underground objects include land mines, the method may further comprise detonating the land mines after identification of the underground objects as land mines. The land mines may be marked and subsequently detonated. Alternatively, the carrier vehicle may be equipped with small explosive charges which are deposited in an area about a detected land mine and subsequently detonated under remote control when the area is clear of people.

In accordance with a further feature of the present invention, the incoming pressure waves are analyzed to determine shapes of the underground objects which are compared with a reference library of possible underground objects. In this way, the underground objects may be automatically identified. Knowing the type of an land mine facilitates selection of a method for destroying or otherwise deactivating the mine.

A system for detecting objects hidden underground comprises, in accordance with the present invention, a carrier movable over a land surface and a plurality of electromechanical transducers mounted to the carrier, the electromechanical transducers including at least one electroacoustic pressure wave generator and at least one acoustoelectric sensor. A source of alternating electrical current is operatively connected to the pressure wave generator for energizing the generator to produce an outgoing pressure wave transmittable to an effective extent through upper layers of a ground formation. Components are operatively connected to the electromechanical transducers for determining locations of the transducers relative to one another. These components may be the carrier itself, in the case of a rigid carrier, or circuitry such as software-modified generic computer circuits for computing the relative locations of the transducers from the transmission times and/or signal strengths of pressure waves transmitted from the pressure wave generator(s) to the sensor(s). A wave analyzer is operatively connected to the sensor(s) for analyzing incoming pressure waves reflected by an underground surfaces in response to the outgoing pressure wave, to determine three-dimensional shapes of underground objects. Also, a propulsion mechanism is operatively connected to the carrier for moving the carrier over the land surface.

The carrier may take the form of a flexible web. For instance, the web may be a rubber blanket which is rolled out over or dragged along a ground surface to lie on a selected section of ground. Alternatively, the web may be the lower panel of a container holding a fluid medium. The container may includes a substantially rigid upper panel and flexible panels connected to the rigid panel. The fluid acts to press the lower panel of the container into substantial conforming contact with an underlying ground surface.

As discussed above, the system includes a video signal generator operatively connected to the wave analyzer for producing a video signal encoding an image of an underground object, the video signal generator being operatively connected to a video monitor for displaying the image.

DESCRIPTION OF THE PREFERRED EMBODIMENTS

Figure 1:
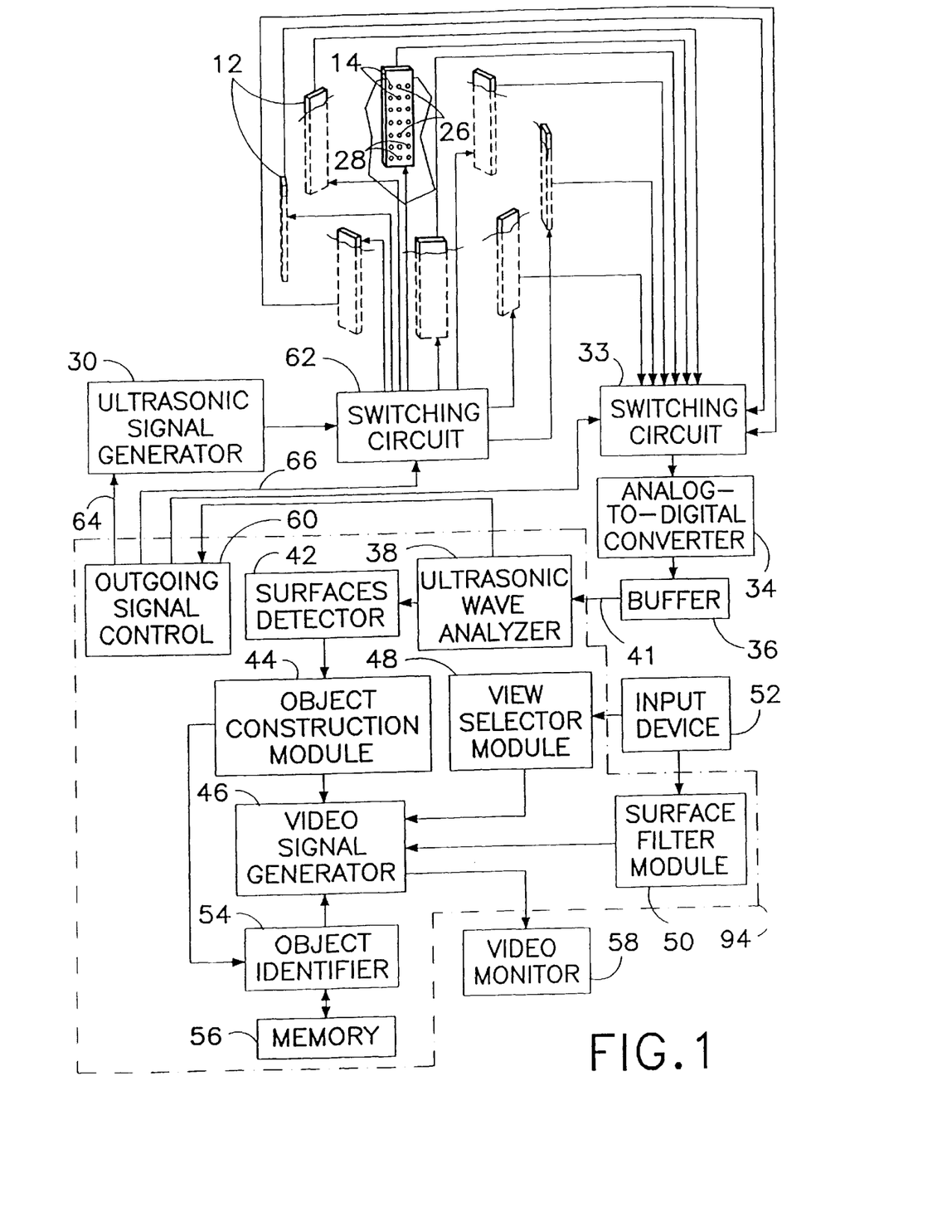
FIG. 1 is partially a schematic perspective view, partly broken away, and partially a block diagram of an ultrasonic system for underground surveying, showing a plurality of transducer carriers or frames.

As illustrated in FIG. 1, a system for underground surveying comprises a plurality of substantially rigid frames 12 each carrying a plurality of electromechanical transducers 14 for generating electrical signals encoding ultrasonic echo responses of underground surfaces, for example, a lid surface 16 (see FIG. 2) and a body surface 18 of an object UO buried underground. Object UO might, for example, be a chest or an urn containing valuable archeological objects.

Figure 2:
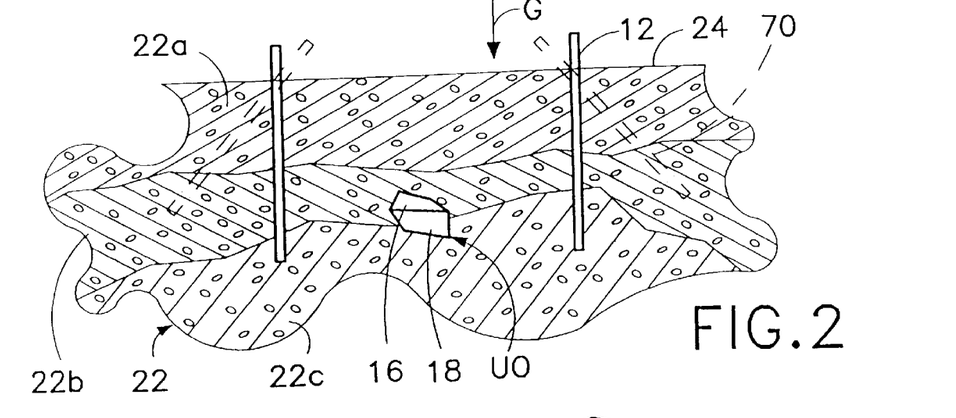
FIG. 2 is a schematic side elevational view of the system of FIG. 1, showing a modification in use of the system.

Each frame 12 carries at least one ultrasonic transducer 14. Upon an insertion of the frames through a ground surface 24, transducers 14 are disposed in physical contact with underground structures 22 capable of transmitting ultrasonic pressure waves. As illustrated in FIG. 2, the underground structures 22 may include a plurality of geologic layers 22a, 22b and 22c each capable of transmitting ultrasonic pressure waves. In most cases, the material of the underground structures incorporates significant quantities of water. Thus, the underground mass may be a clay deposit, a marsh or a water-filled porous land mass. The water may be present naturally or supplied to the land mass in order to carry out the ultrasonic sensing techniques described herein Transducers 14 include one or more electroacoustic transducers 26 and one or more acoustoelectric sensors 28. Frames 12, with the electromechanical transducers 14 thereon, are deployable underground so that the transducers are disposed in an array which has at least two dimensions. An a-c current or ultrasonic signal generator 30 is operatively connected to electroacoustic transducers 26 for energizing the electroacoustic transducers with electrical signals of one or more pre-established ultrasonic frequencies. So energized, the electroacoustic transducers 26 produce ultrasonic pressure waves in the underground formations or structures 22 in which the respective frames or carriers 12 are disposed.

In order to make use of the ultrasonic signal information obtained by sensors or electromagnetic transducers 14, the relative positions of the sensors must be known. Pursuant to one methodology, frames 12 are deployed at predetermined positions and at pre-established angles relative to ground surface 24. Accordingly, because the locations of the transducers 14 on frames 12 are known, the underground locations of the sensors relative to one another will be known. Alternatively, a position determination circuit 32 (FIG. 3) is operatively connected to sensors or electromechanical transducers 14 for determining locations of the sensors relative to one another.

After being reflected or echoed by underground surfaces, where there is a change in the rate of transmission or conduction of the pressure waves, the pressure waves are detected by acoustoelectric sensors 28 Sensors 28 generate electrical signals having frequencies corresponding to those of the incoming pressure waves. The electrical signals are transmitted via a multiplexer or switching circuit 33 to an analog-to-digital converter 34 into digital signals which are temporarily stored in a buffer 36 for timely analysis by a preliminary signal processing circuit or ultrasonic wave analyzer 38. Wave analyzer 38 includes position determination circuit 32 (FIG. 3) and a time base 40.

Figures 3, 9:
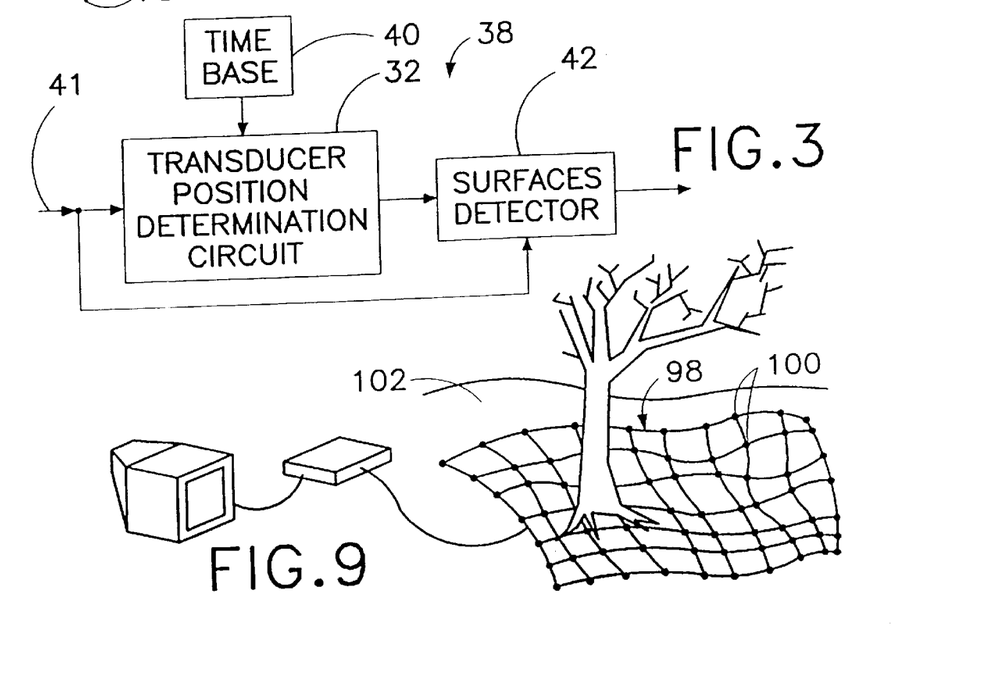
FIG. 3 is a block diagram showing selected components of a wave analyzer and a surface detector module shown in FIG. 1.
FIG. 9 is a schematic perspective view of another system for underground surveying, in accordance with the present invention.

Circuit 32 receives, via a lead or multiple 41 extending from analog-to-digital converter 34 and buffer 36, electrical signals derived from incoming pressure waves. Circuit 32 separates out those signals corresponding to direct or unreflected ultrasonic pressure wave transmission paths to determine the relative locations of sensors or transducers 14 (both electroacoustic transducers 26 and acoustoelectric sensors 28). The encoded locations of transducers 14 are communicated by circuit 32 to a surfaces detector module 42. Module 42 analyzes incoming electrical signals from sensors 28 to determine and analytically define the surfaces of an underground object UO which generate reflected or echoed pressure waves in response to ultrasonic pressure waves from transducers 26. Time base 40 enables operation of circuit 32 and module 42.

As illustrated in FIG. 1, module 42 is connected at an output to an object construction module 44 which analyzes the surface information from module 42 to determine whether a collection of detected surfaces fit together to form an object. Module 44 thus determines the three-dimensional shapes of the underground object UO. Module 44 is connected at outputs to a video signal generator 46 which produces, from the object information from module 44, an image of underground object UO. The image is varied by generator 46 in accordance with instructions from a view selector module 48 and a surface filter module 50. In response to commands from an input device 52 such as a keyboard or a mouse, view selector 48 provides instructions to video signal generator 46 as to the angle and magnification of the image encoded in the video signal. In response to additional commands from input device 52, filter module 50 instructs video signal generator 46 to remove one or more surfaces from the image of underground object UO, thereby enabling the inclusion in the image of objects inside of or behind object UO.

Object construction module 44 is also connected at an output to an object identifier circuit 54 which consults a memory 56 in a pattern recognition or comparison operation to determine the identity or object type of underground object UO. If an identification is established, object identifier circuit 54 provides instructions to video signal generator for incorporating identification information into the video signal. The identification information may include words or symbols providing a name and known historical data pertaining to the class of objects into which object UO is determined to fall.

Generator 46 is connected to a video monitor 58 for displaying the view-selected and surface-filtered image of underground object UO, together with any ancillary information discovered by object identifier circuit 54.

Preliminary signal processing circuit or wave analyzer 38 is operatively connected to ac current or ultrasonic signal generator 30 via an outgoing signal control unit 60. Control unit 60 produces a control signal which determines, for example, the frequency of an outgoing ultrasonic pressure wave produced by electroacoustic transducers 26 and the identity of the particular electroacoustic transducer 28 generating that pressure wave. Signal generator 30 is a variable-frequency ultrasonic signal source and is connected to electroacoustic transducers 26 via a multiplexer or switching circuit 62. Signal generator 30 and switching circuit 62 receive control signals via respective leads 64 and 66 from control unit 60. Switching circuit 62 operates to connect signal generator 30 sequentially to different electroacoustic transducers 26. Typically, the energization sequence of transducers 26 is pre-established and determined in part by the specific configurations of transducers 26 and sensors 28 on frames 12.

Similarly, control unit 60 is connected to multiplexer or switching circuit 33 via a lead or multiple 68 for inducing that circuit to sequentially connect analog-to-digital converter 36 to different acoustoelectric sensors 28 The connection sequence of sensors 28 is also pre-established and determined in part by the specific configurations of transducers 26 and sensors 28 on frames 12.

In many cases, in order to facilitate the separation of incoming reflected signals originating at different electroacoustic transducers 26, these transducers are activated with signals of detectably different ultrasonic frequencies. The sequence of transducer activation and the frequency or frequencies of actuation are communicated by control unit 60 to surfaces detector module 42. Detector module 42 utilizes that information to properly analyze the arriving ultrasonic signals. In the event that the incoming data are insufficient for detector module 42 to isolate, calculate and define surfaces of underground object UO, the detector module may transmit a signal to control unit 60 to change the energization sequence of transducers 26 and/or the energization frequencies.

As illustrated in FIG. 2, frames 12 may be inserted into ground formations or underground structures 22 in substantial parallelism with a local gravity vector G or, alternatively, at an angle to that vector, as indicated in phantom lines 70.

Figure 4:
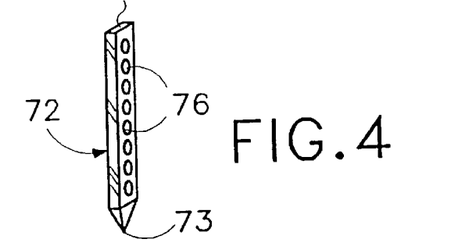
FIG. 4 is a schematic perspective view of a modified transducer carrier or frame.
Figure 5:
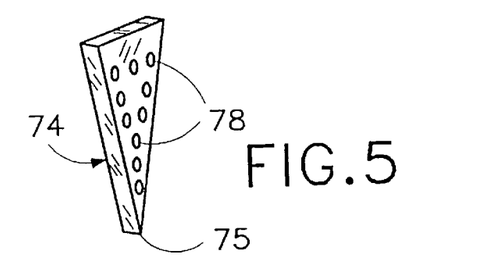
FIG. 5 is a schematic perspective view of another modified transducer carrier or frame.

FIGS. 4 and 5 depict alternative frames or transducer carriers 72 and 74. These alternative frames are provided with sharp end points 73 and 75 for facilitating the insertion of the frames through a ground surface (24 in FIG. 2). As described hereinabove with reference to FIG. 1, frames 72 and 74 carry electromechanical transducers 76 and 78 which include electroacoustic transducers (not separately designated) for generating outgoing pressure waves and acoustoelectric sensors (not individually labeled) for detecting incoming reflected or refracted pressure waves.

It is to be noted that the connections of transducers 26 and sensors 28 to switching circuits 62 and 33 may be implemented via wireless communications links or via wires.

Figure 6:
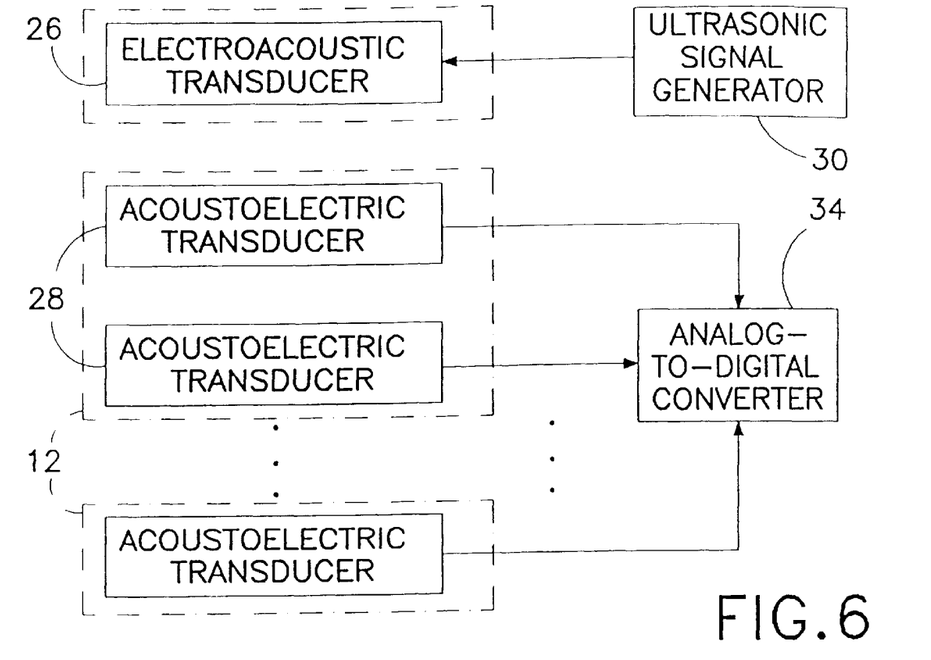
FIG. 6 is a block diagram showing a specific variant of the system of FIG. 1.

FIG. 6 shows a specific configuration of an underground-topography imaging system including just one electroacoustic transducer 26 and a multiplicity of acoustoelectric sensors 28. Here the enhancement of image resolution and optimization of surface detection and definition are accomplished mainly by varying the ultrasonic output frequency of the one electroacoustic transducer and the sequence of signal transmission from acoustoelectric sensors 28.

Figure 7:
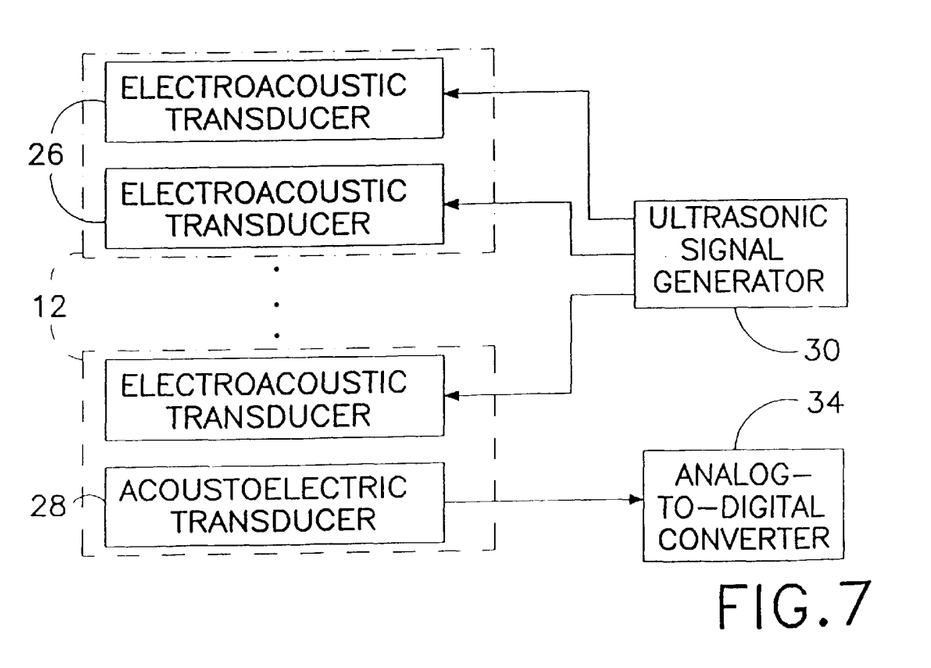
FIG. 7 is a block diagram showing another variant of the system of FIG. 1.

FIG. 7 depicts a particular configuration of another underground-topography imaging system including just multiple electroacoustic transducers 26 and a single acoustoelectric sensor or transducer 28. In this case, the enhancement of image resolution and optimization of surface detection and definition are accomplished by varying the ultrasonic output frequencies and the energization sequence of the electroacoustic transducers.

Figure 8:
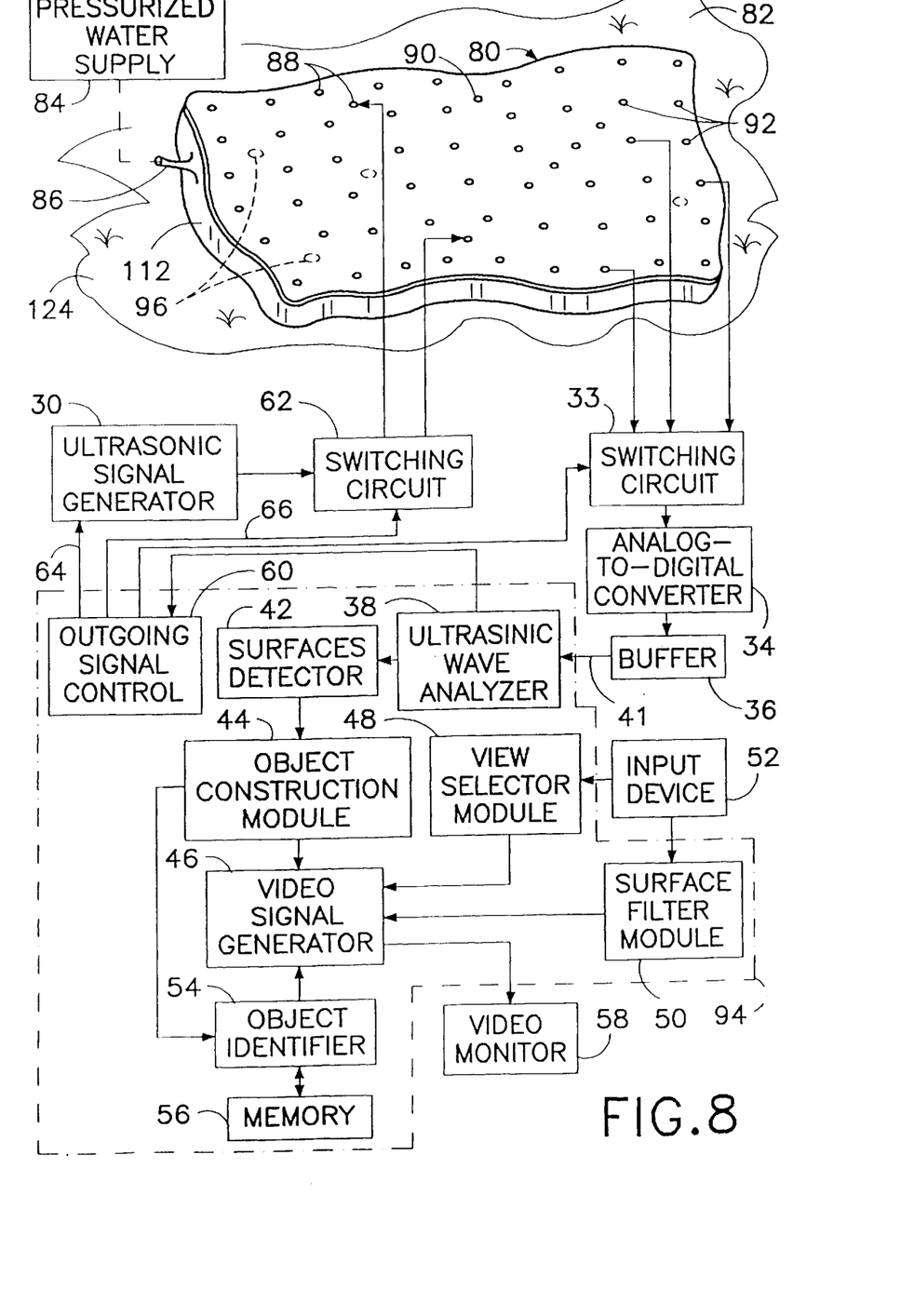
FIG. 8 is a schematic perspective view of a system for underground surveying, in accordance with the present invention.

As illustrated in FIG. 8, another system for conducting an underground survey comprises a liquid filled receptacle 80 disposable on a ground surface 82. Generally, the receptacle is disposed on the ground surface prior to being filled with liquid such as water from a supply 84. Supply 84 is connected to an inlet port 86 of receptacle 80. A valve (not shown) may be provided for regulating liquid flow to and from receptacle 80.

Receptacle 80 may take the form of a rubber or polymeric bag which may have a single internal chamber (not shown) or multiple internal chambers separated by partitions (not shown). In a specific variation of the receptacle 80, an upper wall (not separately designated) of the receptacle is a rigid panel while the other walls of the receptacle are flexible, thereby permitting a conforming of the bag to a ground surface This variation with its rigid upper panel, or any other variation where receptacle has a substantially rigid frame or support structure, facilitates transport and relocation of the receptacle, for instance, by a helicopter, a crane, a forklift, etc.

Disposed on or inside receptacle 80 are a plurality of electromechanical transducers 88 including one or more electroacoustic transducers 90 and one or more acoustoelectric sensors 92. Electronic circuit functional block components of the embodiment of FIG. 8 are the same as in the embodiment of FIG. 1 and carry the same reference numerals. Thus, electroacoustic transducers 90 are operatively connected in a predetermined sequence to signal generator 30 via multiplexer or switching circuit 62 under the control of unit 60. Acoustoelectric sensors 92 are connected to wave analyzer 38 via switching circuit 33, analog-to-digital converter 34 and buffer 36. The digitized reflected pressure wave signals are processed by analyzer 38, surfaces detector module 42, object construction module 44, and object identifier 54 as discussed above with reference to FIG. 1. These circuit components, together with video signal generator 46, view selector module 48, filter module 50 and outgoing signal control unit 60, may be implemented as generic computer circuits modified by special purpose programming. Reference numeral 94 designates a computer.

As discussed above with reference to FIGS. 1 and 2, ground surface 82, as well as underlying subsurface structures (see FIG. 2), may be wetted to facilitate the conduction of ultrasonic pressure waves. To that end, receptacle 80 may be provided in a lower surface with apertures 96 for enabling the passage of liquid from the receptacle onto ground surface 82 and into the underlying subsurface structures. Of course, this technique will be applicable only if the underlying surfaces are capable of absorbing the liquid.

It is to be noted that the transducer-carrying frames 12 of FIGS. 1 and 2, as well as the receptacle 80 of FIG. 8, may be used where acoustic or pressure waves are generated by a source other than a transducer, for example, an explosive charge. To that end, a number of frames 12 in the embodiment of FIG. 1 may be provided with explosive charges. To compute effectively exact locations of the explosive charges relative to the acoustoelectric sensors 28 and of the acoustoelectric charges relative to each other, the explosive charges may be provided in pairs, with a first charge being detonated to enable automatic determination of the relative positions of the explosive charges and the acoustoelectric transducers. The second charge of each pair is then deployed in the same location as the respective detonated charge and subsequently detonated to generate acoustic or pressure waves of different frequencies in the underground structures or formations. The explosive charges used in this process are of substantially less power than the charges used in oil and seismic exploration inasmuch as the depths of underground searching for buried artifacts and other articles of manufacture are generally substantially less than the search depths for oil and gas deposits.

FIG. 9 illustrates a frame or carrier in the form of a net 98 to which a plurality of electromechanical transducers 100 are attached. Transducers 100 include one or more acoustoelectric sensors (not separately designated) and optionally includes one or more electroacoustic transducers (not separately designated). Transducers 100 are adapted for placement in pressure-wave-transmitting contact with a ground surface 102. The exact design of the transducers depends on the type (frequency) of pressure waves being used in the surveying process. The type of pressure waves in turn depends in part on the nature of the underground structures or formations below surface 102 and on the nature of surface 102. Higher frequencies (e.g, ultrasonic) may be transmitted through wet land structures than through dry land structures (rock)

Figure 10:
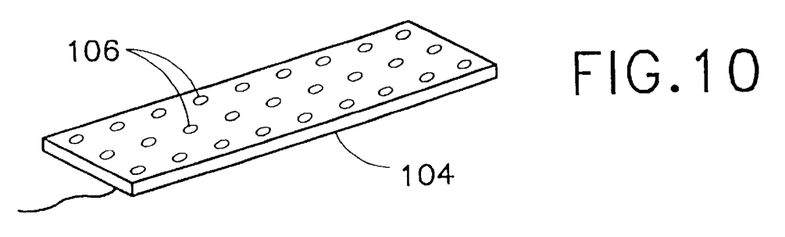
FIG. 10 is a schematic perspective view of a transducer pad utilizable in an underground surveying system in accordance with the present invention.

FIG. 10 depicts a carrier pad 104 to which a plurality of electromechanical transducers 106 are attached. Pad 104 may be used with the circuitry illustrated, for example, in FIG. 8, to determine the locations, shapes, contents, and identities of objects buried underground. It is to be noted that in many cases, the frequencies of emitted pressure waves are most effectively distributed through a range of sonic frequencies. Of course, because resolution capability of a scanning or search process is dependent on the frequencies being used, a range of frequencies are suggested where the sizes of possible buried objects vary dramatically.

Where ultrasonic frequencies are used, it is advantageous in many instances if the ground structure being surveyed is wet, such as clays or marshland. A ground structure may be infused with water to produce a desirable degree of wetness.

Figures 11, 12:
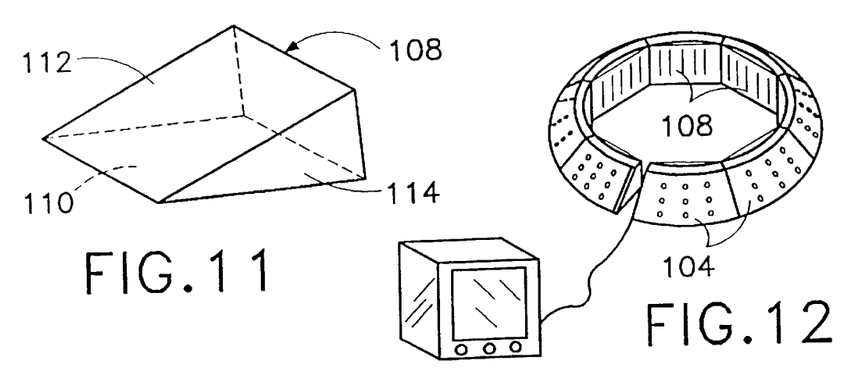
FIG. 11 is a schematic perspective view of an alternatively inflatable and collapsible frame member utilizable in an underground surveying system.
FIG. 12 is a schematic perspective view of an underground surveying system utilizing the elements of FIGS. 10 and 11.

FIG. 11 shows a wedge-shaped frame 108 having a lower wall 110 and an upper wall 112 disposed at an angle relative to one another. Frame 108 may be a balloon or container which is expandable into the illustrated configuration upon being filled via a port 114 with a liquid such as water. As shown in FIG. 12, a plurality of expanded frames 108 are disposed in a predetermined configuration such as a circle, with a plurality of pads 104 being disposed on the upper walls 112 of frames 108 in pressure-wave-transmitting contact therewith. Pads 104 are effectively part of upper walls 112.

Figure 13:
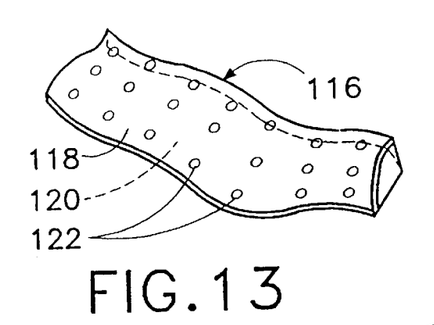
FIG. 13 is a schematic perspective view of another alternatively inflatable and collapsible frame member utilizable in an underground surveying system, showing the frame member in a collapsed configuration.
Figure 14:
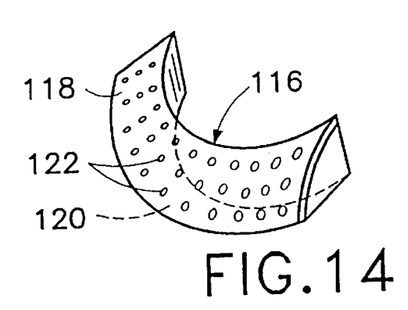
FIG. 14 is a view similar to FIG. 13 showing the frame member of in an expanded configuration.
Figure 15:
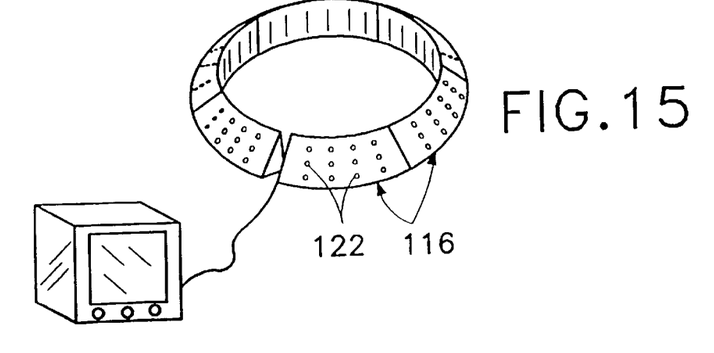
FIG. 15 is a schematic perspective view of an underground surveying system utilizing the elements of FIGS. 13 and 14.

In an alternative pressure-wave transmission assembly, a plurality of collapsible containers or balloons 116 (FIG. 13) each having an arcuate configuration in an expanded condition (FIG. 14) are placed side by side to form a circle (FIG. 15). Each container or balloon 116 has an upper wall 118 and a lower wall 120 oriented at a wedge angle to one another in the expanded condition of the respective balloon or container. Each container or balloon 1 16 is provided on upper wall 118 with a plurality of electromechanical transducers 122 in a pre-established array.

The underground surveying equipment of FIGS. 10–12 and FIGS. 13–15 are disposed at a site above buried treasure or other artifacts of value The circular configurations are intended to surround the suspected site to facilitate the derivation or generation of reflected or echoed sonic or ultrasonic signals The underground surveying equipment of FIGS. 10–12 and FIGS. 13–15 may use ultrasonic pressure waves to detect underground objects and the surfaces of those objects, as discussed above with reference to FIGS. 1 and 8. In another alternative technique, the pressure waves are sonic waves of controlled frequencies generated by transducers. Alternatively, the underground pressure waves may be generated by explosive devices. For example, an explosive device might be implanted below the surface within the circular configuration of FIG. 12 or 15. Where an explosive device is used, the pressure waves generated by the explosive device must be computer analyzed with Fourier transforms or other wave-deconstructing algorithms to determine the frequency spread of the pressure waves generated by the particular explosion. The wave analysis of incoming reflected waves is then carried out based on the computed outgoing wave packet. Of course, the pressure waves generated by an explosive device will include sonic frequencies as well as ultrasonic and subsonic frequencies.

Figure 16:
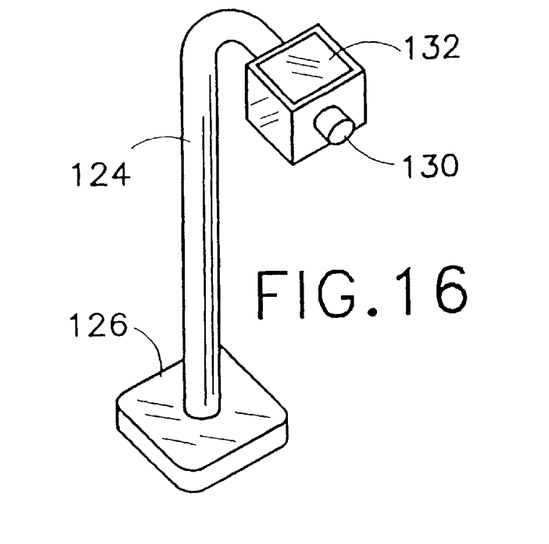
FIG. 16 is a schematic perspective view of a hand-held or hand-manipulable underground surveying device.
Figure 17:
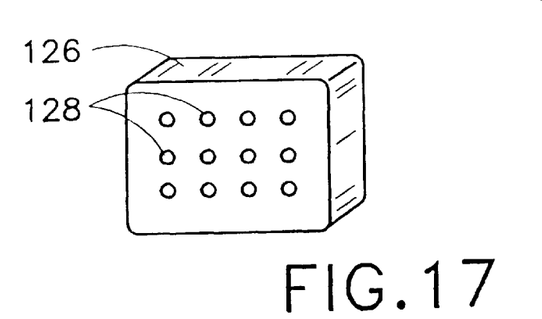
FIG. 17 is a schematic perspective bottom view of a transducer carrier component shown in FIG. 16.
Figure 18:
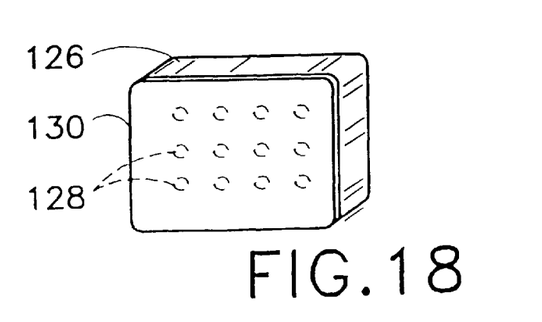
FIG. 18 is a schematic perspective bottom view shoving a modification of the transducer carrier component of FIGS. 16 and 17.
Figure 19:
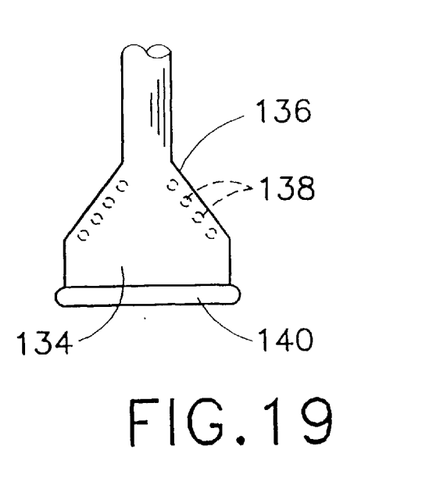
FIG. 19 is a partial elevational view of another modification of the transducer carrier component of FIGS. 16 and 17.
Figure 20:
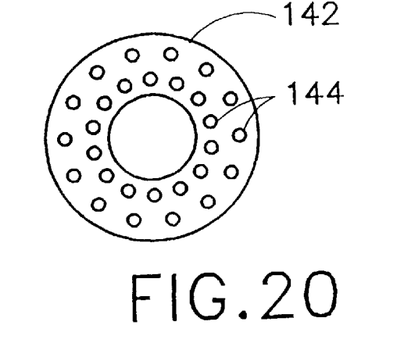
FIG. 20 is a partial elevational view of yet another modification of the transducer carrier component of FIGS. 16 and 17.

FIG. 16 illustrates a hand-held or hand-manipulable device for conducting underground searches. A shaft 124 is provided at a lower end with a frame 126 carrying an array of electromechanical pressure-wave transducers 128 (FIG. 17). As shown in FIG. 18, a flexible pad 130 filled with water or other liquid is attachable to the bottom side of frame 126 for enhancing the conduction of pressure waves to and/or from transducers 128. At an upper end, shaft 124 is provided with a handle 130 and a video display 132. Alternative configurations of frame 126 are illustrated in FIGS. 19 and 20. In FIG. 19, a frame or transducer carrier component 134 has a pyramidal or conical shape and is provided along sloped sides 136 With an array of electromechanical transducers 138. A water filled pad 140 may be provided along a bottom end of frame or carrier component 134. In FIG. 20, a frame or carrier 142 is ring shaped and has transducers 144.

Figure 21:
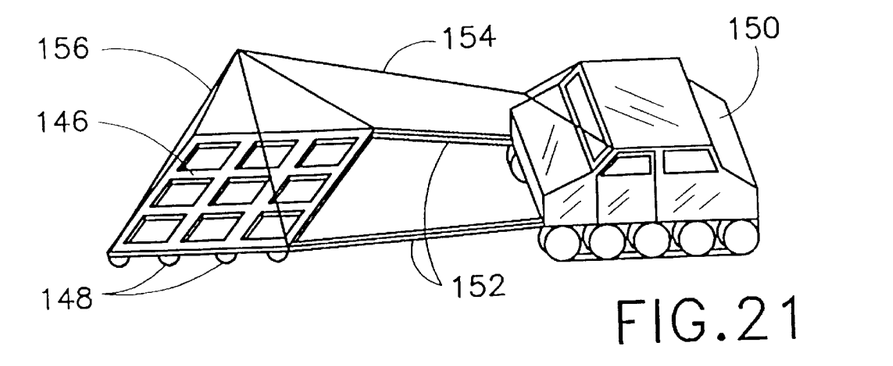
FIG. 21 is a schematic perspective view of transducer-carrying elements of a sonic and/or ultrasonic object detection system in accordance with the present invention.

As illustrated in FIG. 21, a rigid frame 146 carrying a plurality of electromechanical transducers 148 is mounted to a land vehicle 150 via a pair of rigid arms 152 and a cable 154 connected at one end to vehicle 150 and at an opposite end to a pyramidal trusswork 156 rigid with frame 146. Transducers 148 are operatively connected to signal generating components and signal analyzing components as discussed hereinabove with reference to FIGS. 1 and 8. The pressure waves generated by transducers 148 may include sonic frequencies, as well as ultrasonic frequencies. Several different frequencies may be generated simultaneously for produced pressure waves of the same multiple frequencies. Reflected waves are separated by filters (not shown) and analyzed separately. Alternatively, or additionally, the different frequencies may be produced in seriatim.

The apparatus of FIG. 21 is especially suited to detecting land mines along a road. A pair of frames 146 may be mounted to opposite sides of vehicle 150 for searching a two dimensional area such as a field or a yard. Every other pass of vehicle 150 in a snaking search pattern utilizes the frame on the same side of the vehicle. Thus, the frames alternate from pass to pass.

When a land mine is detected using the apparatus of FIG. 21, a marker is planted at the site of the detected mine, The mine is subsequently detonated by designated personnel. Vehicle 150 may take a path around the detected land mine to continue the search along the subject road. Alternatively, vehicle 150 may reverse itself to await destruction of the detected mine. In a modified procedure, vehicle 150 may be used itself to deposit an explosive device proximately to the detected mine The explosive device is detonated by remote control, once vehicle 150 has removed itself to a safe location.

Arms 152 may be pivotably mounted to frame 146 and vehicle 150 for purposes of enabling a variation in the height of frame 146 above a road surface. Drives (not shown) may be connected to arms 152. as well as to cable 154 for purposes of automatically changing the height of frame 146.

Figures 22, 23, 24, 25:
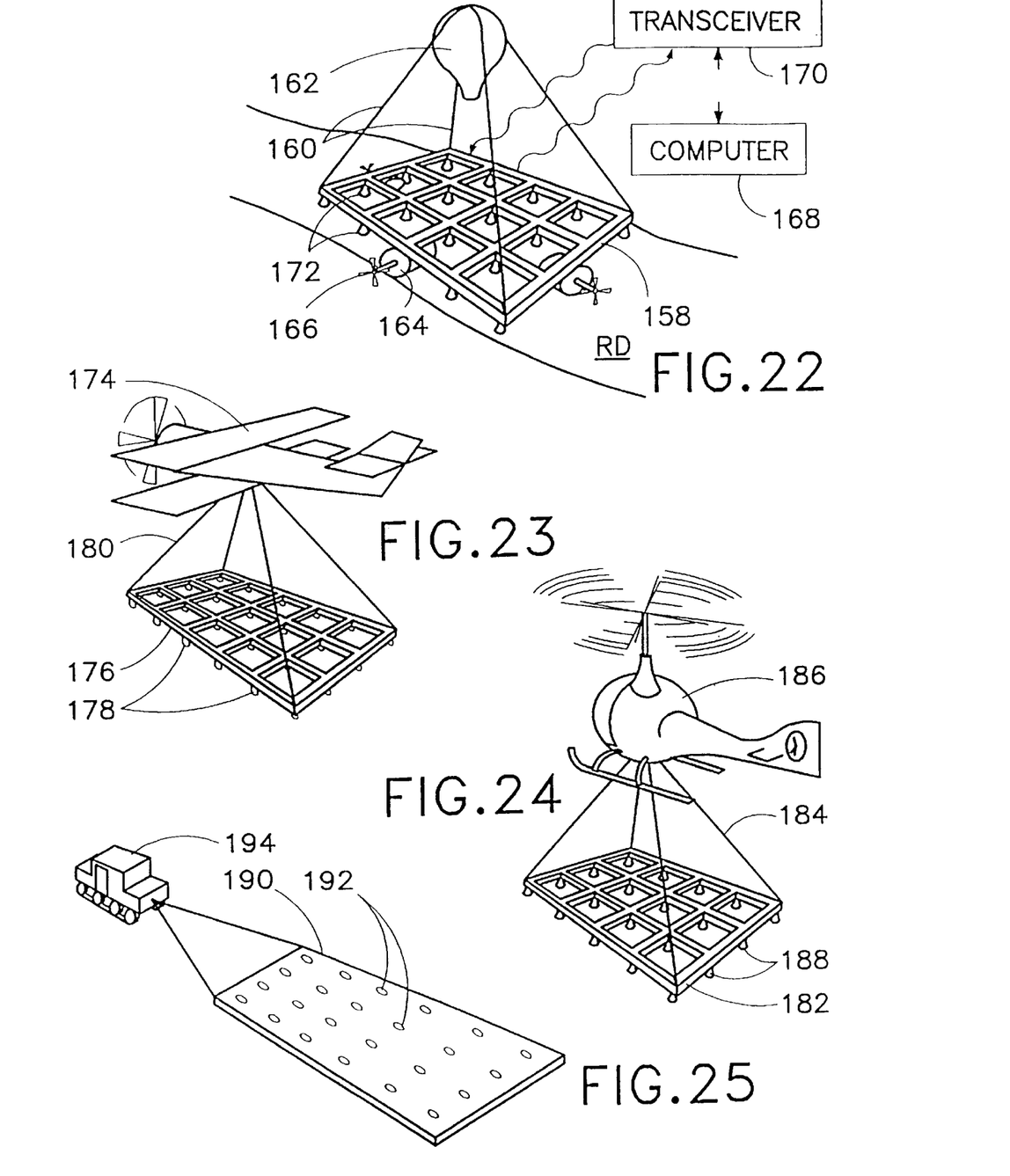
FIG. 22 is a schematic perspective view of transducer-carrying elements of another sonic and/or ultrasonic object detection system in accordance with the present invention.
FIG. 23 is a schematic perspective view of transducer-carrying elements of a further sonic and/or ultrasonic object detection system in accordance with the present invention.
FIG. 24 is a schematic perspective view of transducer-carrying elements of a modified sonic and/or ultrasonic object detection system in accordance with the present invention.
FIG. 25 is a schematic perspective view of transducer-carrying elements of yet another sonic and/or ultrasonic object detection system in accordance with the present invention.

Another way of moving, a rigid frame 158 above a ground surface such as a road RD is depicted in FIG. 22. Frame 158 is suspended by cables 160 from a helium-filled balloon 162. Frame 158 and/or balloon 162 is provided with motors 164 and propellers 166 for changing the position of frame 158 relative to ground or road surface RD. Preferably, motors 164 are remotely connected by a computer 168 transmitting instructions and control signals via a wireless transceiver 170. Conventional means (not shown), wirelessly controlled by computer 168, for elevating or lowering balloon 162 and frame 158 may also be provided.

Frame 158 carries a plurality of electromechanical transducers 172 for generating outgoing pressure waves of different frequencies and for detecting incoming pressure waves reflected by underground surfaces in response to the outgoing pressure waves. Signal generators for energizing the outgoing wave generators may be mounted to frame 158 and controlled by instructions from computer 168 transmitted wirelessly over transceiver 170. In response to the incoming pressure waves, sensors among transducers 172 produce analog signals which may be transmitted (after proper modulation) to computer 168 via transceiver 170. Alternatively, some signal processing of the analog signals may be performed on frame 158. In yet another alternative configuration of the system of FIG. 22, computer 168 may be located on frame 158. In that case, transceiver 170 is used to transmit instructions from an operator to the on-board computer and to relay, from the on-board computer to a monitor, a video signal encoding images of underground objects.

As discussed above with reference to FIGS. 1 and 8, object identifier 54 is used to identify different types of land mines. To that end, memory 56 stores shape and size specifications of known types of land mines. Memory 56 may additionally store ancillary information such as operating specifications and deactivating sequences of the various known types of land mines, if available. Accordingly, in some cases, detected land mines may be deactivated and subsequently disassembled, rather than detonated.

Scanning systems as described herein for detecting and identifying underground objects are capable of determining positions of detected underground objects with respect to a given reference point. The determined coordinates may be used as markers for enabling subsequent visits to the locations of the detected objects, for instance, with the aim of digging up the objects, in the case of buried artifacts of value, or destroying the objects, in the case of land mines. Markers may also be physical indicators deposited on a ground surface for identifying the locations and/or natures of detected objects which are underground.

FIG. 23 illustrates an alternative transport vehicle 174 in the form of a remote-controlled airplane. A framework 176 carrying transducers 178 is suspended by cables 180 from plane 174. FIG. 24 depicts a scanning system wherein a frame 182 is suspended by cables 184 from a helicopter 186. Transducers 188 are mounted to frame 182.

As shown in FIG. 25, an alternative technique for detecting underground objects utilizes a pad 190 to which a plurality of electromechanical transducers 192 are attached. A remote-controlled robot 194 such as a miniature all-terrain vehicle is attached to one end of the pad for dragging the pad along a ground surface Where the detection of land mines is intended, it is contemplated that robot 194 and pad 190 are sufficiently light weight to avoid mine detonation when the robot and the pad move over land mines Pad 190 may be stored in a coiled configuration inside a container. Robot 194 may be used to remove pad 190 from such a container, for example, by pulling and unrolling the pad at the onset of a scanning operation.

It is to be noted that transducers 192 have a density or spacing which facilitates detection of objects of an intended group. Thus, to detect land mines, which are typically located within two feet of the surface, the transducers have a density greater than that necessary to detect buried archeological ruins. Transducers 192 are energizable with alternating electrical waveforms of different frequencies, for purposes of facilitating soil penetration and surface detection.

Figure 26:
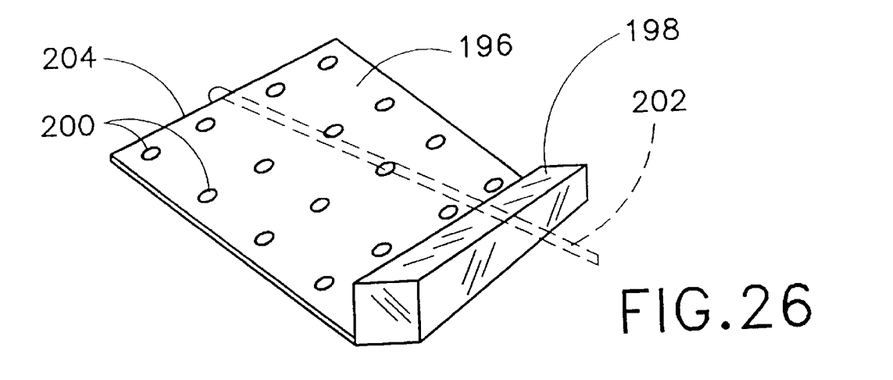
FIG. 26 is a transducer-carrying pad and storage container of another sonic and/or ultrasonic object detection system in accordance with the present invention.

FIG. 26 shows a flexible pad 196 which is stored in a wound-up configuration (not shown) inside a container 198. Pad 196 carries a plurality of electromechanical transducers 200 (such as speakers and microphone sensors) in a predetermined array. In order to place pad 196 over a ground surface harboring suspected land mines, a rod 202 may be used to grasp or hook a leading edge 204 of pad 196 and pull the pad out of storage container 198. Rod 202 is further used to position pad 196 over a selected ground surface area.

Thus, it is clear that a flexible transducer-carrying pad as discussed hereinabove with reference to FIGS. 10, 25 and 26 may be pushed or pulled over a ground surface. Markers (not shown) may be left on the ground surface to indicate the locations of detected land mines. Where an air-borne vehicle such as balloon 162, plane 174 or helicopter 186 is used, markers may be dropped from the vehicle. Alternatively, input from the surface scanning may be used to identify pre-existing surface markers or reference points. The locations of detected mines relative to the selected pre-existing reference points are calculated by the wave-analyzing computer and stored for future use in destroying detected land mines.

Figure 27:
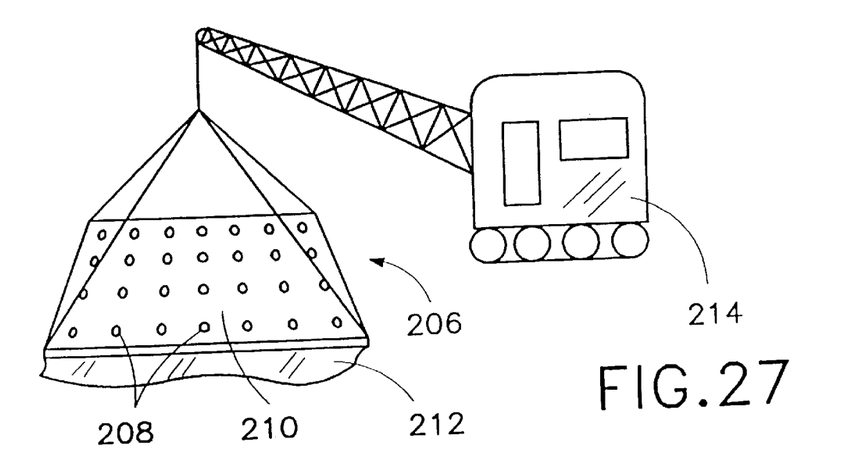
FIG. 27 is a schematic perspective view of transducer-carrying elements of yet another sonic and/or ultrasonic object detection system in accordance with the present invention.

As illustrated in FIG. 27, a carrier 206 for electromechanical transducers 208 may comprise a rigid panel 210 attached to an upper side or forming an upper wall of a flexible bag 212. Bag 212 may be filled with a fluid medium such as gel or water for purposes of enhancing pressure wave transmission to and from an uneven ground surface. Carrier 206 is placed in position by a crane 214.

Various safety feature may be incorporated into a land mine detection system as described hereinabove, particularly where the carrier vehicle is manned. For example, with reference to FIG. 21, an automatic engine or transmission shut-off may be provided for immediately ceasing forward motion of vehicle 162 if a land mine is detected. This feature is especially advantageous where the vehicle moves continuously during a scanning operation, rather than intermittently.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proferred by way of example to facilitate comprehension of the invention and should not be construed to limit the scope thereof.

What is claimed is:

1. A method for detecting visually inaccessible objects, comprising:

disposing a plurality of electromechanical transducers including at least one electroacoustic pressure wave generator and at least one acoustoelectric sensor above a ground structure;

determining locations of said transducers relative to one another;

energizing said pressure wave generator to produce an outgoing pressure wave;

transmitting said outgoing pressure wave towards said ground structure;

sensing incoming pressure waves reflected by hidden surfaces in response to said outgoing pressure wave; and analyzing said incoming pressure waves to determine multiple surfaces of a hidden object at least proximate to said ground structure and to construct a three-dimensional shape of said hidden object from the determined surfaces thereof.

2. The method defined in claim 1 wherein said electromechanical transducers are all attached to a common carrier, the disposing of said electromechanical transducers above said ground structure includes moving said carrier into position above said ground structure.

3. The method defined in claim 2 wherein said carrier is flexible, the disposing of said electromechanical transducers above said ground surface including placing said carrier in contact with a ground surface.

4. The method defined in claim 3 wherein the locations of said transducers are determined after the placing of said carrier in contact with said ground surface, determining the locations of said transducers relative to one another includes analyzing pressure waves transmitted directly from said pressure wave generator to said sensor.

5. The method defined in claim 2 wherein said carrier and said electromechanical transducers are air-borne, the disposing of said electromechanical transducers above said ground structure including suspending said carrier and said electromechanical transducers over said ground surface.

6. The method defined in claim 1 wherein said outgoing pressure wave has a plurality of different frequencies.

7. The method defined in claim 6, further comprising generating said different frequencies at different times.

8. The method defined in claim 1, further comprising generating a video signal encoding an image of an underground object and transmitting said video signal to a video monitor.

9. The method defined in claim 8, further comprising selecting said image from among a multiplicity of possible images of said surfaces, further comprising subsequently selecting a different image from among said possible images and displaying said different image on said monitor.

10. The method defined in claim 1 wherein the disposing of said electromechanical transducers above said ground structure includes operating a remote control robot to shift said transducers into a predetermined position above said ground surface.

11. The method defined in claim 1 wherein said outgoing pressure wave and said incoming pressure waves are ultrasonic, further comprising wetting said ground structure to facilitate transmission of said outgoing pressure wave and said incoming pressure waves through said ground structure.

12. The method defined in claim 1 wherein said underground object is a land mine, further comprising detonating said land mine after identification of said underground object as a land mine.

13. The method defined in claim 1 wherein the analyzing of said incoming pressure waves includes determining a shape of said underground object and comparing said shape with a reference library of possible underground objects.

14. A system for detecting visually inaccessible objects, comprising:
   a carrier movable over a land surface;
   a plurality of electromechanical transducers mounted to said carrier, said electromechanical transducers including at least one electroacoustic pressure wave generator and at least one acoustoelectric sensor;
   means operatively connected to said electromechanical transducers for determining locations of said transducers relative to one another;
   a source of alternating electrical current operatively connected to said pressure wave generator for energizing said generator to produce an outgoing pressure wave transmittable to an effective extent through upper layers of a ground formation;
   a wave analyzer operatively connected to said sensor for analyzing incoming pressure waves reflected by underground surfaces in response to said outgoing pressure wave, to determine multiple surfaces of a hidden object and to construct a three-dimensional shape of said hidden object from the determined surfaces thereof; and
   a propulsion mechanism operatively connected to said carrier for moving said carrier over said land surface.

15. The system defined in claim 14 wherein said carrier is a flexible web.

16. The system defined in claim 15 wherein said web is a part of a container holding a fluid medium.

17. The system defined in claim 16 wherein said container includes a substantially rigid panel and flexible panels connected to said rigid panel.

18. The system defined in claim 14, further comprising a video signal generator operatively connected to said wave analyzer for producing a video signal encoding an image of an underground object, said video signal generator being operatively connected to a video monitor for displaying said image.

19. The system defined in claim 14 wherein carrier is mounted to a land vehicle incorporating said propulsion mechanism.

20. The system defined in claim 14 wherein carrier is mounted to an air-borne vehicle incorporating said propulsion mechanism.

21. The system defined in claim 14 wherein said carrier and said electromechanical transducers are air-borne, the disposing of said electromechanical transducers above said ground structure including suspending said carrier and said electromechanical transducers over said ground surface.

22. The system defined in claim 14 wherein said source includes means for producing a plurality of different frequencies.

23. The system defined in claim 14 further comprising means operatively connected to said propulsion mechanism for remotely controlling said propulsion mechanism.

24. A method for detecting visually inaccessible objects, comprising:
   disposing a plurality of electromechanical transducers including at least one electroacoustic pressure wave generator and at least one acoustoelectric sensor above a ground structure;
   determining locations of said transducers relative to one another;
   energizing said pressure wave generator to produce an outgoing pressure wave;
   transmitting said outgoing pressure wave towards said ground structure;
   sensing incoming pressure waves reflected by hidden surfaces in response to said outgoing pressure wave;
   analyzing said incoming pressure waves to determine three-dimensional shapes of hidden objects at least proximate to said ground structure; and
   generating, from the determined three-dimensional shape of one of said hidden objects, a video signal encoding an image of said one of said hidden objects and transmitting said video signal to a video monitor to display said image thereon.

25. A method for detecting visually inaccessible objects, comprising:
   disposing a plurality of electromechanical transducers including at least one electroacoustic pressure wave generator and at least one acoustoelectric sensor above a ground structure;
   determining locations of said transducers relative to one another;

energizing said pressure wave generator to produce an outgoing pressure wave;

transmitting said outgoing pressure wave towards said ground structure;

sensing incoming pressure waves reflected by hidden surfaces in response to said outgoing pressure wave; and analyzing said incoming pressure waves to determine three-dimensional shapes of hidden objects at least proximate to said ground structure, wherein the analyzing of said incoming pressure waves includes determining shapes of said underground objects and comparing said shapes with a reference library of possible underground objects.

26. A system for detecting visually inaccessible objects, comprising:

a carrier movable over a land surface;

a plurality of electromechanical transducers mounted to said carrier, said electromechanical transducers including at least one electroacoustic pressure wave generator and at least one acoustoelectric sensor;

means operatively connected to said electromechanical transducers for determining locations of said transducers relative to one another;

a source of alternating electrical current operatively connected to said pressure wave generator for energizing said generator to produce an outgoing pressure wave transmittable to an effective extent through upper layers of a ground formation;

a wave analyzer operatively connected to said sensor for analyzing incoming pressure waves reflected by underground surfaces in response to said outgoing pressure wave, to determine three-dimensional shapes of hidden objects;

a video signal generator operatively connected to said wave analyzer for generating, from the determined three-dimensional shape of one of said hidden objects, a video signal encoding an image of said one of said hidden objects;

a video monitor operatively coupled to said video signal generator for receiving said video signal therefrom and for displaying said image; and a propulsion mechanism operatively connected to said carrier for moving said carrier over said land surface.

* * * * *